United States Patent
Jourdain et al.

(10) Patent No.: US 10,260,347 B2
(45) Date of Patent: Apr. 16, 2019

(54) STEAM SUPPLY CIRCUIT FROM A TURBINE

(71) Applicant: ALSTOM Technology Ltd, Baden (CH)

(72) Inventors: Vincent Jourdain, Paris (FR); Bernard Viola, Saint-Pierre-du-Perray (FR); Damien Milet, Paris (FR)

(73) Assignee: General Electric Technology GmbH, Baden (CH)

( * ) Notice: Subject to any disclaimer, the term of this patent is extended or adjusted under 35 U.S.C. 154(b) by 1146 days.

(21) Appl. No.: 13/913,849

(22) Filed: Jun. 10, 2013

(65) Prior Publication Data

US 2014/0030068 A1     Jan. 30, 2014

Related U.S. Application Data (63) Continuation of application No. PCT/EP2011/071866, filed on Dec. 6, 2011.

(30) Foreign Application Priority Data

Dec. 10, 2010    (FR) ...................................... 10 60338

(51) Int. Cl.
    *F01D 1/18*        (2006.01)
    *F01D 1/02*        (2006.01)
                  (Continued)

(52) U.S. Cl.
    CPC ............... *F01D 1/18* (2013.01); *F01D 1/023* (2013.01); *F01D 15/10* (2013.01); *F01D 17/18* (2013.01); *F02C 1/05* (2013.01)

(58) Field of Classification Search
    CPC .......... F01D 1/023; F01D 15/10; F01D 17/18; F01D 1/18; F01K 13/00; F01K 13/006; F02C 1/05
                  (Continued)

(56) References Cited

U.S. PATENT DOCUMENTS 1,798,894 A *   3/1931   Noack ................... F01D 17/145
                                                             60/662
4,053,745 A     10/1977   Podolsky et al.
                      (Continued)

FOREIGN PATENT DOCUMENTS

CN           1208148 A     2/1999
CN           1904324 A     1/2007
               (Continued)

OTHER PUBLICATIONS

Unofficial English Translation of Russian Notice of Allowance issued in connection with corresponding RU Application No. 2013131801 dated Jul. 17, 2014.

*Primary Examiner* — Justin Seabe
*Assistant Examiner* — Joshua R Beebe
(74) *Attorney, Agent, or Firm* — Cynthia W. Flanigan; GE Global Operation (57) ABSTRACT

The technical field of the invention is steam turbines including a steam feed circuit based on a functional steam generator set that may be nuclear- or fossil-fuel powered, and in particular a steam feed circuit (1) of a turbine (2), comprising n main steam lines (3) and n' steam admission lines (4) to the turbine, the number n' of steam admission lines (4) to the turbine being strictly greater than the number n of main steam lines (3), characterized in that there are n direct steam admission lines (5) to the turbine linking the as main steam lines (3) directly to the steam admission lines (4) to the turbine.

9 Claims, 7 Drawing Sheets

(51) Int. Cl.
*F01D 15/10* (2006.01)
*F01D 17/18* (2006.01)
*F02C 1/05* (2006.01)

(58) Field of Classification Search
USPC .......................................................... 415/116
See application file for complete search history.

(56) References Cited

U.S. PATENT DOCUMENTS

| | | | |
|---|---|---|---|
| 4,087,860 A * | 5/1978 | Beatty | F01K 9/023 60/656 |
| 4,118,935 A * | 10/1978 | Andersson | F01K 7/20 290/40 R |
| 4,120,159 A * | 10/1978 | Matsumoto | F01D 19/02 290/40 C |
| 4,177,387 A * | 12/1979 | Malone | F01D 17/24 290/40 R |
| 4,178,763 A | 12/1979 | Stern et al. | |
| 4,309,873 A * | 1/1982 | Koran | F01D 25/08 60/646 |
| 4,320,625 A * | 3/1982 | Westphal | F01D 19/02 60/646 |
| 4,333,310 A * | 6/1982 | Uram | F01K 23/105 60/39.182 |
| 4,368,773 A * | 1/1983 | Frater | F01K 9/023 60/665 |
| 4,403,476 A * | 9/1983 | Johnson | F01D 17/105 60/652 |
| 4,499,756 A * | 2/1985 | Medeiros | F01D 21/20 60/660 |
| 4,512,185 A * | 4/1985 | Ghrist, III | F01D 17/145 73/112.02 |
| 4,551,796 A * | 11/1985 | Singh | F22B 35/004 290/40 C |
| 4,555,906 A * | 12/1985 | Martens | B01D 19/0068 60/657 |
| 4,841,722 A | 6/1989 | Bjorge | |
| 6,668,537 B1 | 12/2003 | Hays | |
| 2002/0020166 A1 | 2/2002 | Asakura et al. | |
| 2011/0304159 A1 | 12/2011 | Juretzek | |

FOREIGN PATENT DOCUMENTS

| | | |
|---|---|---|
| EP | 1 719 890 | 11/2006 |
| SU | 853284 A1 | 8/1981 |
| SU | 1094971 A1 | 5/1984 |
| WO | 89/03471 | 4/1989 |

\* cited by examiner

*Prior Art*

STEAM SUPPLY CIRCUIT FROM A TURBINE

TECHNICAL FIELD OF THE INVENTION

The technical field of the invention is turbines driving a generator and including a steam feed circuit. The heat source of a steam generator may be equally nuclear or fossil fuel.

PRIOR ART

The problem of supplying steam to a turbine driving a generator from a functional steam generator set arranged in parallel, each delivering the steam at substantially the same pressure, is already addressed by several devices, in particular placing a manifold between the different main steam lines and the turbine steam admission lines. This manifold enables all of the steam supplied by the functional steam generator set to be collected and to be distributed to the first wheel of the steam turbine via a set of steam admission lines, each having adjustment means.

Indeed, an electricity generation installation includes a turbine supplied with steam by one or more steam generators. The main steam lines are defined below as lines running from the steam generator(s) to the turbine and the admission lines are defined as lines carrying the steam from these main steam lines to the admission orifices of the turbine and including turbine admission members, a manifold usually forming the joint between the lines. Several lines are required in consideration both of the number of steam generators arranged in parallel and technological dimensioning requirements (maximum speed, maximum diameter, etc.) but not as a result of different steam pressure levels present. The manifold enables the pressure levels of the steam generators operating in parallel to be balanced, as well as providing a stable source for the various steam users in the power station.

Figure 1:
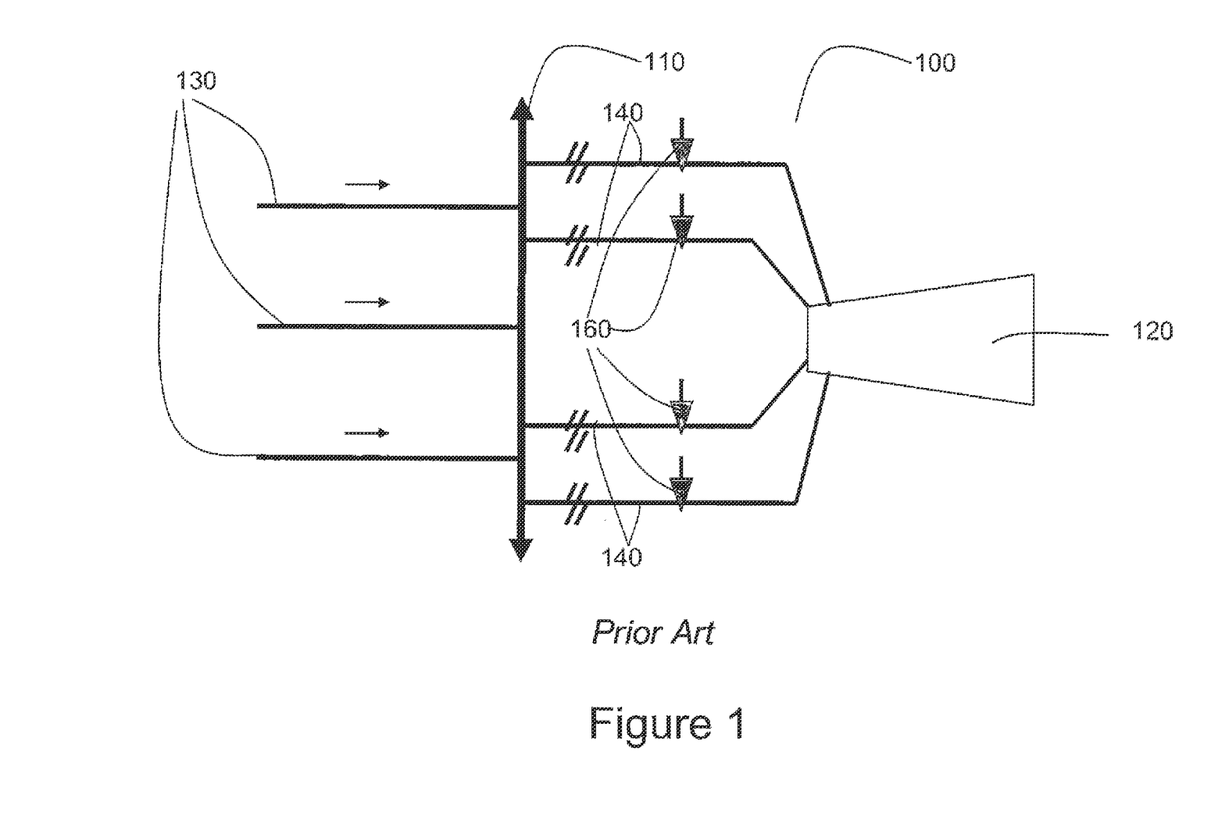
FIG. 1 is a diagram of a steam feed circuit of a turbine according to a known embodiment in the prior art in which n'=n+1=4.
Figure 2:
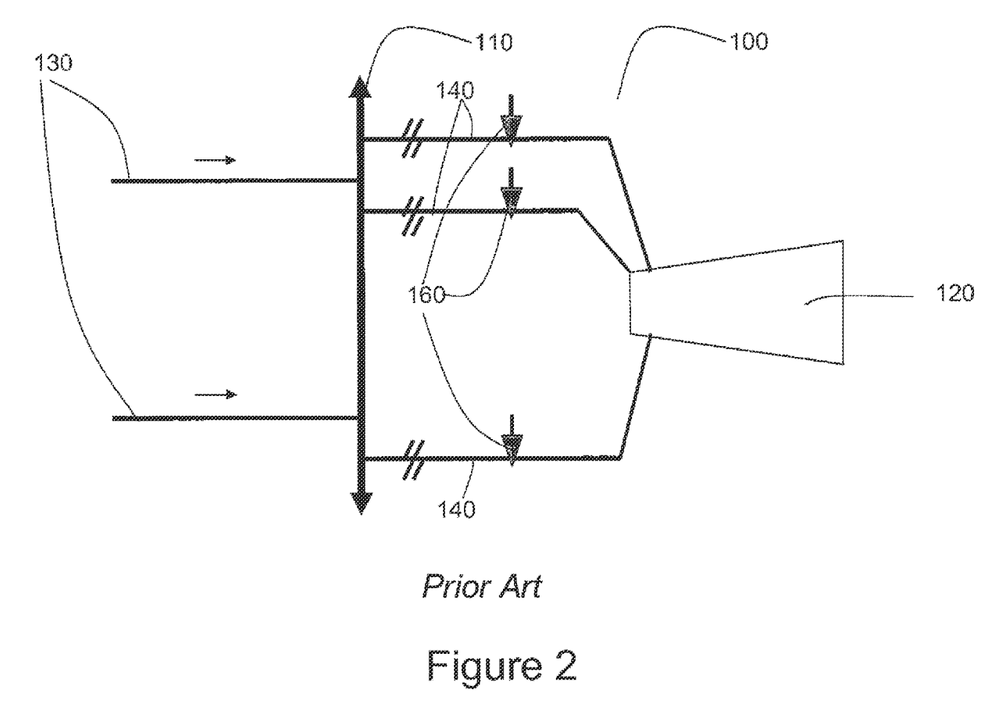
FIG. 2 is a diagram of a steam feed circuit of a turbine according to a known embodiment in the prior art in which n'=n+1=3.
Figure 3:
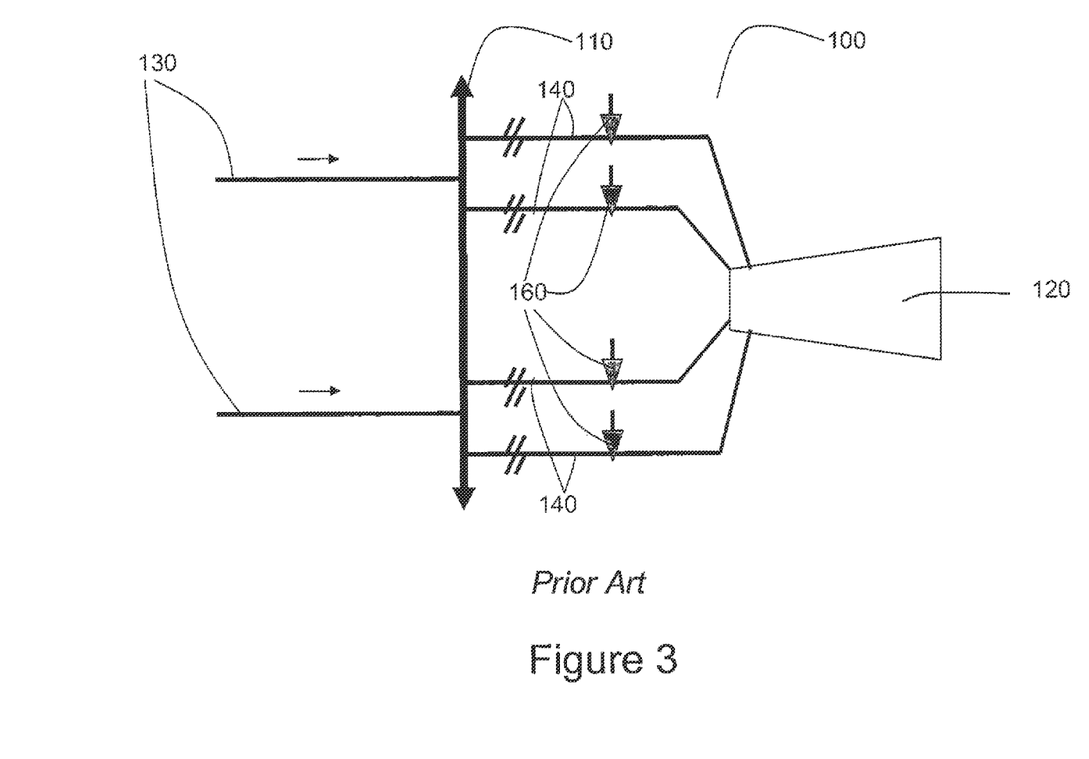
FIG. 3 is a diagram of a steam feed circuit of a turbine according to a known embodiment in the prior art in which n'=n+2=4.

Thus, in known arrangements, of which several known variants are shown in FIGS. 1, 2 and 3 the main steam lines 130 supply the steam admission lines 140 to the turbine 120 by means of a manifold 110 often arranged orthogonally to the main steam lines 130 and the admission lines 140 respectively. The main steam lines 130 are placed upstream of the manifold 110 while the steam admission lines 140 to the turbine 120 are located downstream of said manifold 110.

Such devices in particular have the drawback of suffering significant pressure drops. Indeed, in this type of device, the fluid flowing through the lines and passing through a manifold is subject to greater friction on account of a longer feed circuit including numerous direction changes and irregularities. Pressure drops adversely affect the performance of the installation and ultimately reduce the electrical power available.

DESCRIPTION OF THE INVENTION

The invention is intended to resolve the drawbacks in the prior art, in particular the problem of ducting steam to feed a turbine driving a generator. It is in particular intended to propose an optimized steam feed circuit between a functional steam generator set on the one hand and a turbine driving a generator on the other, enabling the performance of such a turbine to be increased. The heat source of the functional steam-generator set may be equally nuclear or fossil fuel.

To do so, and according to a first feature, a steam feed circuit of a turbine is proposed, incorporating n main steam lines and n' steam admission lines to the turbine, the number n' of steam admission lines to the turbine being strictly greater than the number n of main steam lines, characterized in that it includes n direct steam admission lines to the turbine linking the n links of the main steam lines directly to the steam admission lines to the turbine. The number n of main steam lines and the number n' of steam admission lines are features of the installation determined, in particular by the arrangement of the functional steam-generator set and by the number of admission valves in the turbine in question. In this description, an admission line is said to be "direct" if the steam flowing through it can be linked to a specific steam admission line, i.e. it is not the result of a mixture of steam from several main steam lines. Reciprocally, it an admission line receives a mix of steam from several main steam lines, it is said to be "indirect".

According to a specific feature, a main steam line is linked directly to a steam generator. The main steam line thus ducts the pressurized steam. According to a specific feature, a steam admission line is linked directly to the first stage of the turbine.

In other words, according to a first feature, the steam feed circuit of a turbine driving a generator includes at least as many direct steam admission lines to the turbine as main steam lines.

The advantage of this arrangement is to at least partially avoid using the manifold, to reduce the related elbows and to reduce the pressure drops caused by friction and other pressure drops. In a practical application, the reduction of the calculated mean effective pressure drop corresponds to a 0.1% increase in installation performance, which is significant.

Given that the number n' of steam admission lines to the turbine is strictly greater than the number n of main steam lines, and given that the device includes at least as many direct steam admission lines to the turbine as main steam lines, i.e. n direct admission lines, there is a strictly positive number n'−n of admission lines not linked directly to the main steam lines, referred to as indirect admission lines.

According to a specific feature, these indirect admission lines are fed indirectly by at least one of the n direct admission lines by means of at least one diverted steam line tapped onto said direct admission line. This tapping obviates the need to use a main manifold and optimizes pressure drops.

These taps are irregularities that cause pressure drops. Nonetheless, such pressure drops only affect a fraction of the admission flow and have a comparatively lesser impact than the use of a main manifold to feed all of the admission lines. Moreover, the indirect admission line fed by the diverted line is ideally chosen and configured to attenuate the increase in pressure drops.

Moreover, advantageously, at least one diverted steam line is linked to at least one feed line enabling a device other than the turbine to be supplied with steam, whether this use is permanent or intermittent. These other users may, for example, be bypasses of the turbine, steam superheaters or other auxiliary users. For some of these users, the additional pressure drops have no impact on installation performance levels.

According to a preferred embodiment of the invention, n is between 2 and 6) and n' is between 3 and 8.

In particular, two embodiments of the invention appear to be advantageous:

n'=n+1: Advantageously in this specific arrangement, the indirect admission line is fed by exactly n diverted steam lines tapped onto the n respective direct steam admission lines to the turbine.

n'=n+2: Advantageously in this specific arrangement, each of the two indirect admission lines is fed by the diverted steam lines tapped onto some or all of the n respective direct steam admission lines to the turbine.

SHORT DESCRIPTION OF THE FIGURES

Other features and advantages of the invention are set out in the description below, provided with reference to the attached figures in which.

For the sake of clarity, identical or similar elements are marked with identical reference signs on all of the figures.

DETAILED DESCRIPTION OF AN EMBODIMENT

Figure 4:
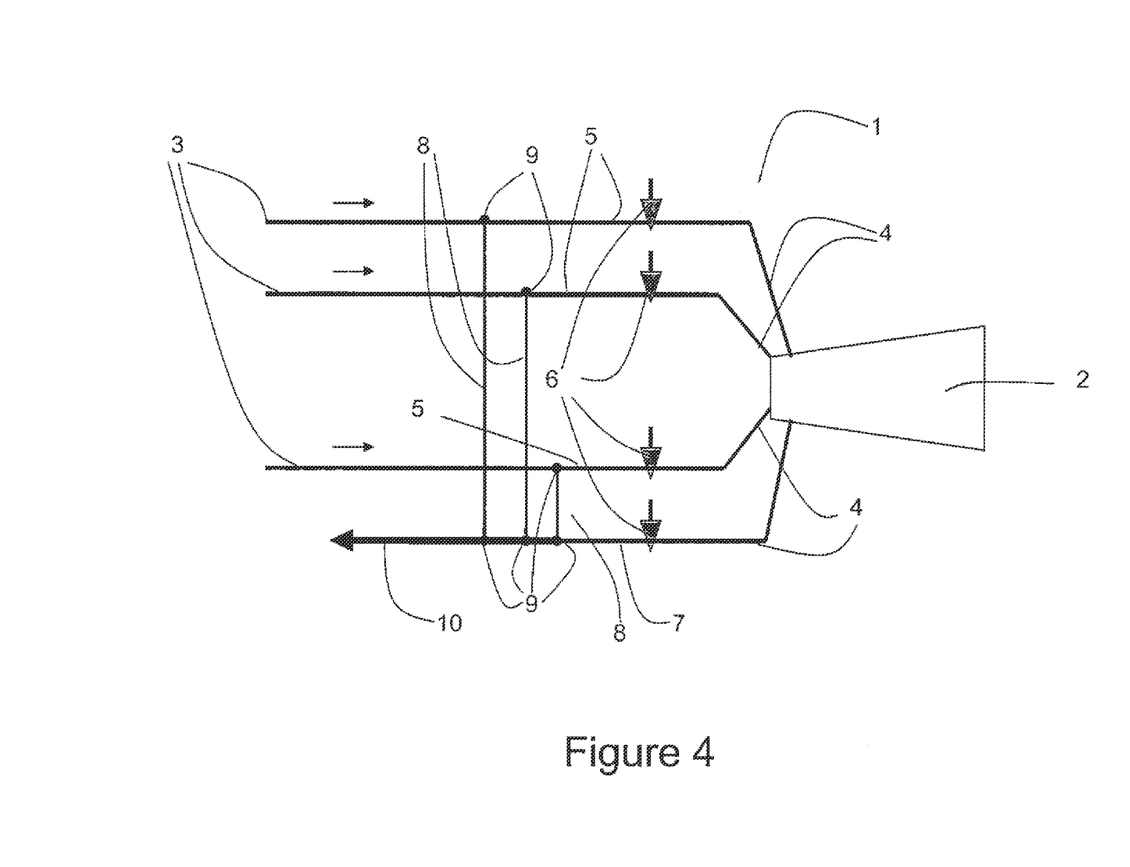
FIG. 4 is a diagram of a steam feed circuit of a turbine according to an embodiment proposed herein in which n'=n+1=4.

FIG. 4 is a diagram of a steam feed circuit 1 of a turbine 2 driving a generator according to an embodiment in which n'=n+1=4. Furthermore, the heat source of the functional steam-generator set supplying the turbine 2 in question is in this case a nuclear source. Indeed, in this embodiment of the invention, the number n' of steam admission lines 4 to the turbine 2 is four and the number n of main steam lines 3 is three. More specifically, the three main steam lines 3 are linked directly to three of the four admission lines 4. The steam feed circuit 1 to the turbine 2 therefore includes three direct admission lines 5.

The admission line not linked directly to a main steam line 3 is linked indirectly to said main steam lines 3 by means of three diverted steam lines 8, each tapped 9 onto one of these three direct admission lines 5, this line being the indirect admission line 7 fed by said three direct lines 5.

A feed line 10 directed towards other steam users is also tapped onto the indirect admission line 7.

For the sake of clarity in the figures, the fine arrows parallel to the steam lines indicate the direction of steam flow in said lines.

Figure 5:
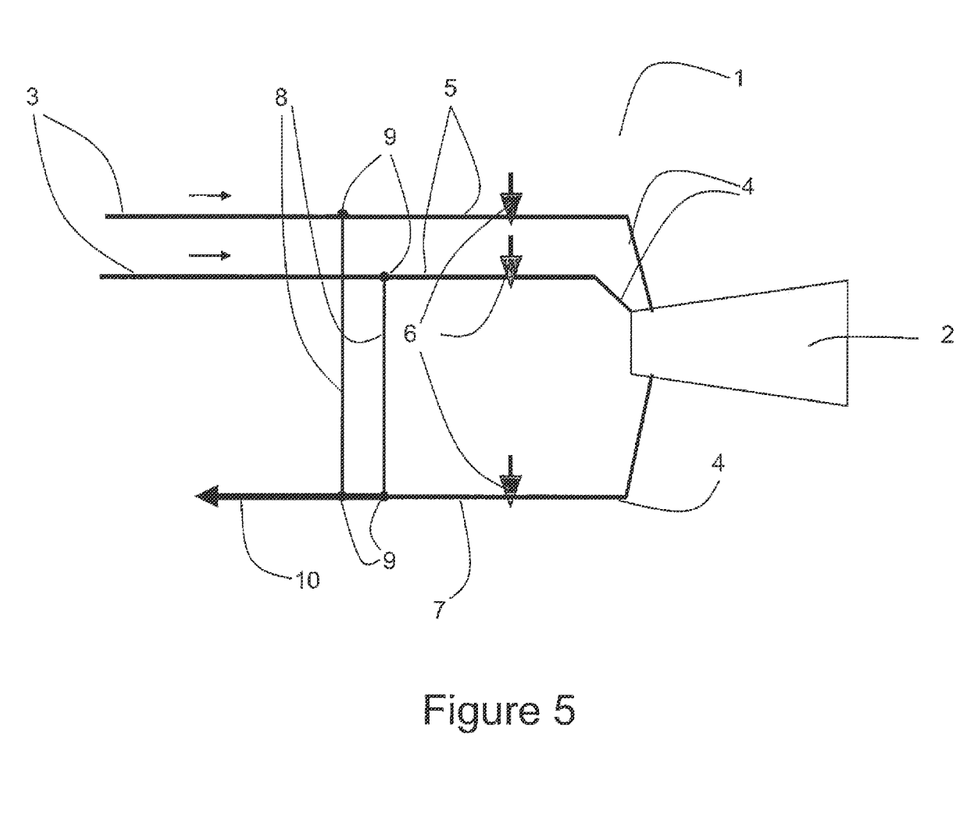
FIG. 5 is a diagram of a steam feed circuit of a turbine according to an embodiment proposed herein in which n'=n+1=3.

FIG. 5 is a diagram of a steam feed circuit 1 of a turbine 2 driving a generator according to an embodiment of the invention in which n'=n+1=3. Indeed, in this embodiment of the invention, the number n' of steam admission lines 4 to the turbine 2 is three and the number 11 of main steam lines 3 is two. In this arrangement, in which n'=n+1, the features are similar to n'=n+1=4 (FIG. 4).

Figure 6:
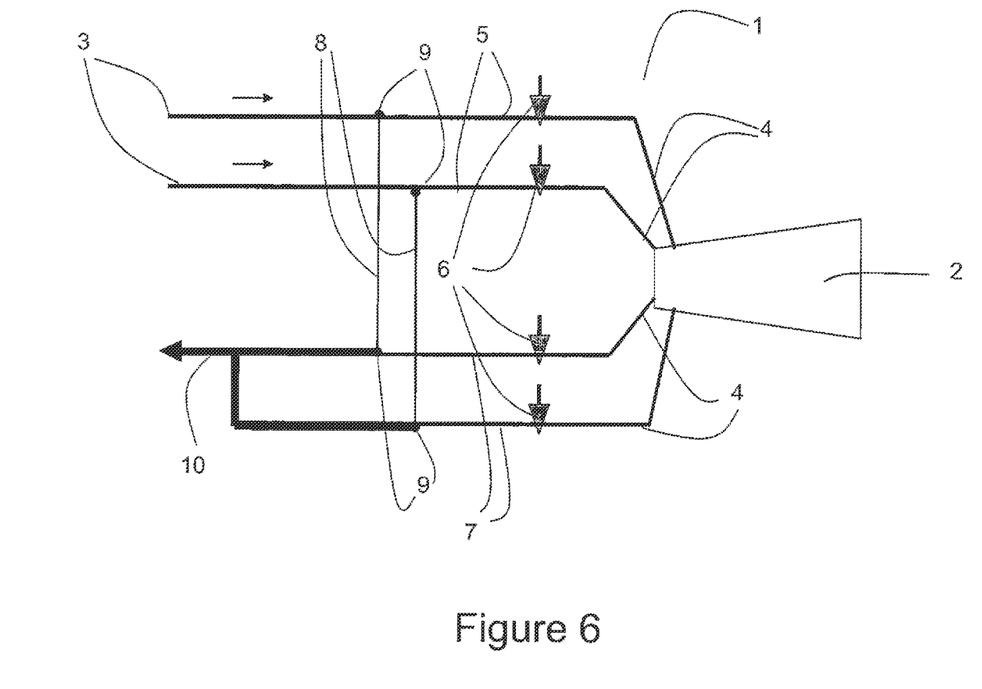
FIG. 6 is a diagram of a steam feed circuit of a turbine according to an embodiment proposed herein in which n'=n+2=4.

FIG. 5 is a diagram of a steam feed circuit 1 of a turbine 2 driving a generator according to an embodiment in which n'=n+2=4. Furthermore, the heat source of the functional steam-generator set supplying the turbine 2 in question is in this case a fossil fuel source. Thus, in this embodiment, the number n' of steam admission lines 4 to the turbine is four and the number in of main steam lines 3 is two. In this arrangement there are still as many direct steam admission lines 5 to the turbine 2 as main steam lines 3, i.e. two. Moreover, the other two admission lines are therefore indirect, referred to as indirect admission lines 7, and fed by tapping 9 onto a direct admission line 5 by means of a diverted steam line 8. These two indirect admission lines also each have a feed line directed to other users.

Figure 7:
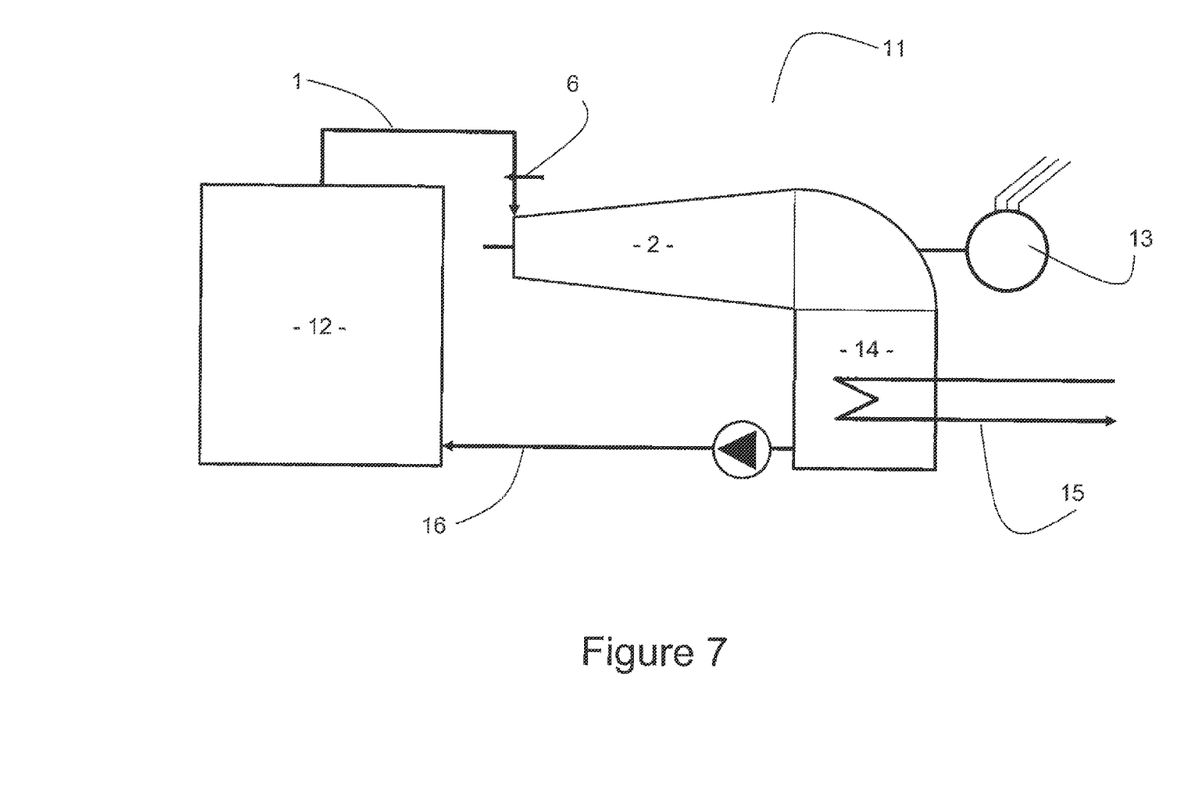
FIG. 7 is a general diagram of a steam cycle in an electricity generation installation including a turbine supplied with steam from a steam generator via a feed circuit according to one embodiment.

FIG. 7 is a general diagram of a steam cycle 11 in an electricity generation installation including a turbine 2 supplied with steam from a steam generator 12 via a feed circuit 1 according to one embodiment. More specifically, a steam generator 12 delivers high-pressure steam to a turbine 2 by means of a main steam feed circuit 1, the steam admission flow to the turbine being regulated by admission valves 6. The pressurized steam passing through the turbine 2 drives a generator 13 that is able to generate electricity. At the output of the turbine 2, the depressurized steam is condensed in a condenser 14 coupled to a heat sink 15. One or more pumps supply the steam generator 12 with condensed water taken from the condenser 14 through pipes 16, it being possible in particular to incorporate heaters and/or gas purgers (not shown in this figure) into these pipes 16.

Numerous modifications may be made to the embodiments described above without moving outside the scope of the invention.

Accordingly, the general shapes of the pipes are shown exclusively for illustrative purposes.

Moreover, the angle of the various taps need not necessarily be a right angle.

Moreover, the number of feed lines directed to other steam users tapped onto the indirect admission line may be variable.

Finally, the invention does not require that the flow rates in each of the valves of the initial arrangement be equal no that the related pipe sections be equal.

The invention claimed is:

1. A steam feed circuit of a turbine comprising n main steam lines in parallel and n' steam admission lines to the turbine in parallel, the number n' of the steam admission lines to the turbine being strictly greater than the number n of the main steam lines diverting from a steam generator;
   wherein there are n direct steam admission lines directly connected to each of the main steam lines; and
   n'−n indirect steam admission lines configured to receive at least a portion of steam from each of the n main steam lines and provide the received steam to the turbine and also to at least one feed line enabling a device other than the turbine to be supplied with steam.

2. The steam feed circuit according to claim 1, wherein each of the n main steam lines are directly connected to a steam generator.

3. The steam feed circuit according to claim 1, wherein each of the n' steam admission lines are directly connected to a first stage of the turbine.

4. The steam feed circuit according to claim 1, wherein the n'−n indirect steam admission lines are configured to receive at least a portion of steam from at least one of the n direct steam admission lines via at least one diverted steam line tapped onto said at least one of the n direct steam admission line.

5. The steam feed circuit according to claim 4, wherein the at least one diverted steam line is configured to supply steam to other auxiliary steam users.

6. The steam feed circuit according to claim 1, wherein n is between 2 and 6 and/or n' is between 3 and 8.

7. The steam feed circuit according to claim 1, wherein $n'=n+1$.

8. The steam feed circuit according to claim 4, wherein the indirect steam admission lines are fed by n diverted steam lines tapped onto the n respective direct steam admission lines to the turbine.

9. The steam feed circuit according to claim 1, wherein $n'=n+2$.

\* \* \* \* \*